(12) United States Patent
Nishioka

(10) Patent No.: US 6,319,029 B2
(45) Date of Patent: Nov. 20, 2001

(54) CARD CONNECTOR HAVING IC CARD EJECTION MECHANISM

(75) Inventor: Toru Nishioka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/753,633

(22) Filed: Jan. 2, 2001

(30) Foreign Application Priority Data

Feb. 4, 2000 (JP) .................................................. 12-032760

(51) Int. Cl.$^7$ .................................................. H01R 13/62
(52) U.S. Cl. .......................................... 439/159; 439/160
(58) Field of Search .................................. 439/159, 160, 439/328, 157

(56) References Cited

U.S. PATENT DOCUMENTS

| | | | |
|---|---|---|---|
| 5,984,702 | * 11/1999 | Nishioka | 439/159 |
| 6,017,231 | * 1/2000 | Yoshitsugu et al. | 439/159 |
| 6,033,243 | * 3/2000 | Kajiura | 439/159 |

FOREIGN PATENT DOCUMENTS 11-135192   5/1999   (JP) .

* cited by examiner

*Primary Examiner*—Renee Luebke
*Assistant Examiner*—Briggitte R. Hammond
(74) *Attorney, Agent, or Firm*—Beyer Weaver & Thomas, LLP

(57) ABSTRACT

The present invention provides a card connector having a mechanism for ejecting a card, wherein, without weakening an energizing force of a spring member for energizing a slide member, the card connector can prevent the card from being popped out of the card connector by the energizing force of the spring member and allows the card to be easily taken out. The card connector includes: a slide member that is slidable in directions in which a card loaded in and unloaded from a housing is inserted and ejected; a return spring for energizing the slide member in the direction in which the card is ejected; a locking member for holding the slide member in the position in which the card is loaded, against an energizing force of the return spring; and a push rod, movably disposed between a standby position and a push-in position, for unlocking the locking member by a pressing operation to move the slide member to the position in which the card is ejected, wherein the push rod is provided with a stopper for blocking the slide member at the card eject position from moving in the card eject direction when the push rod is pressed up to the push-in position, wherein the stopper permits the slide member at a standby position to move in the card eject direction.

6 Claims, 16 Drawing Sheets

CARD CONNECTOR HAVING IC CARD EJECTION MECHANISM

BACKGROUND OF THE INVENTION

1. Field of the Invention

The present invention relates to the construction of a card connector used with an IC card used as a storage medium of personal computers or the like and a CF (compact flash) card used in a digital camera and other electronic apparatuses.

2. Description of the Prior Art

An IC card connector is commonly used as an additional storage unit of a personal computer. An IC card comes into widespread use as a storage medium of the IC card connector.

The IC card is loaded in the IC card connector to write and read necessary information. To increase operability in loading and unloading the IC card, some IC card connectors have an ejection mechanism for ejecting the IC card.

It is known that the conventional IC card ejection mechanism includes a slide member for carrying an IC card, a locking member for holding the slide member in an IC card loaded position, and a spring member for energizing the slide member in an eject direction when the locking member is unlocked, wherein when the IC card is ejected as the slide member moves in the eject direction, the IC card is pushed out in the eject direction by an energizing force of the spring member.

However, the above-described conventional IC card connector has the following problem in terms of construction. Since an IC card is energized in an eject direction along with a slide member for carrying the IC card, by an energizing force of a spring member for energizing the slide member in the eject direction, the energizing force of the spring member causes the IC card to pop out of the IC card connector.

Although an energizing force of the spring member can be weakened to prevent an IC card from popping out, the weakened energizing force of the spring member would make it difficult to obtain strokes required to eject the IC card, making it difficult to take out the IC card.

SUMMARY OF THE INVENTION

For this reason, the present invention intends to solve the above problem by providing a card connector having a mechanism for ejecting a card, wherein, without weakening an energizing force of a spring member for energizing a slide member, the card connector can prevent the card from being popped out of the card connector by the energizing force of the spring member and allows the card to be easily taken out.

To solve the above problems, a card connector of the present invention, as a first means, includes: a slide member that is slidable in directions in which a card loaded in and unloaded from a housing is inserted and ejected; a return spring for energizing the slide member in the direction in which the card is ejected; a locking member for holding the slide member in the position in which the card is loaded, against an energizing force of the return spring; and a push rod, movably disposed between a standby position and a push-in position, for unlocking the locking member by a pressing operation to move the slide member to the position in which the card is ejected, wherein the push rod is provided with a stopper for blocking the slide member at the card eject position from moving in the card eject direction when the push rod is pressed up to the push-in position, wherein the stopper permits the slide member at a standby position to move in the card eject direction.

As a second means, a coil spring is provided which abuts one end of the slide member when the slide member moves in the card eject direction, and the slide member is held in the card eject position by the coil spring against an energizing force of the return spring.

As a third means, the push rod is returned from the push-in position to the standby position by the coil spring.

As a fourth means, the card is movable in the card eject direction along with the slide member, and the coil spring is compressed when the slide member has moved to the card eject position, whereby the slide member moves in the card eject direction and the card can be pulled out.

As a fifth means, the locking member is disposed so that it can turn in a direction perpendicular to a flat surface of the card loaded in and unloaded from the housing by a pressing operation of the push rod, and a spring piece for energizing the locking member is formed on a cover member of the housing.

As a sixth means, the push rod is formed by bending a thin metallic plate.

BRIEF DESCRIPTION OF THE DRAWINGS

A preferred embodiment of the present invention will be described in detail based on the followings, wherein.

DESCRIPTION OF THE PREFERRED EMBODIMENTS

Figure 1:
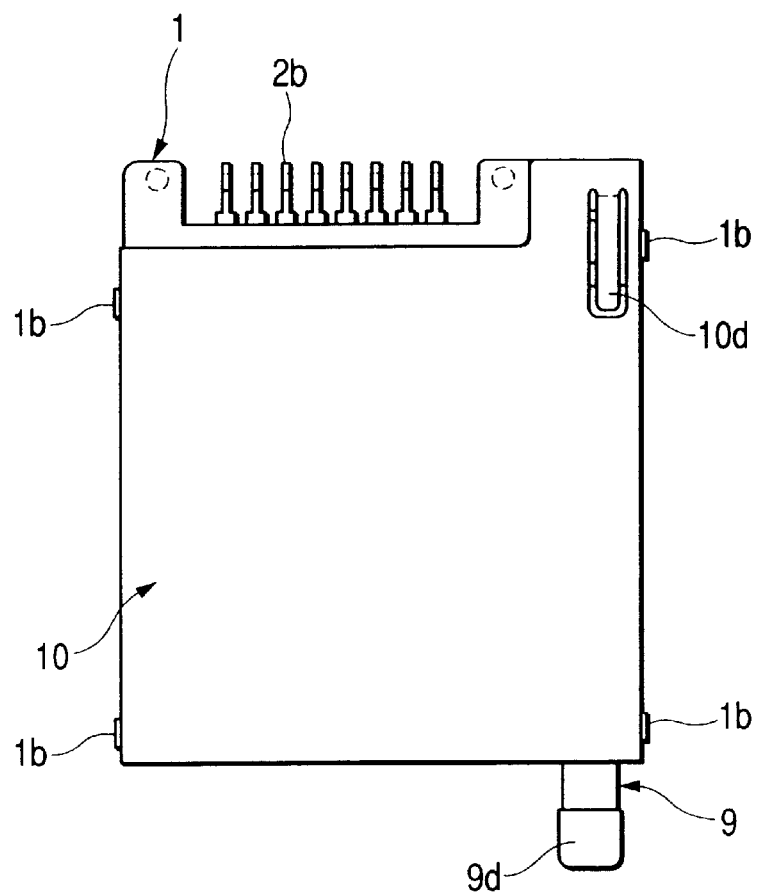
FIG. 1 is a plan view of a card connector of the present invention.
Figure 2:
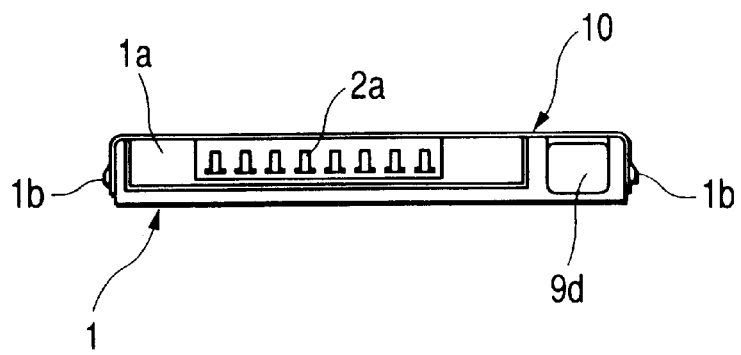
FIG. 2 is a plan view of the same.
Figure 3:
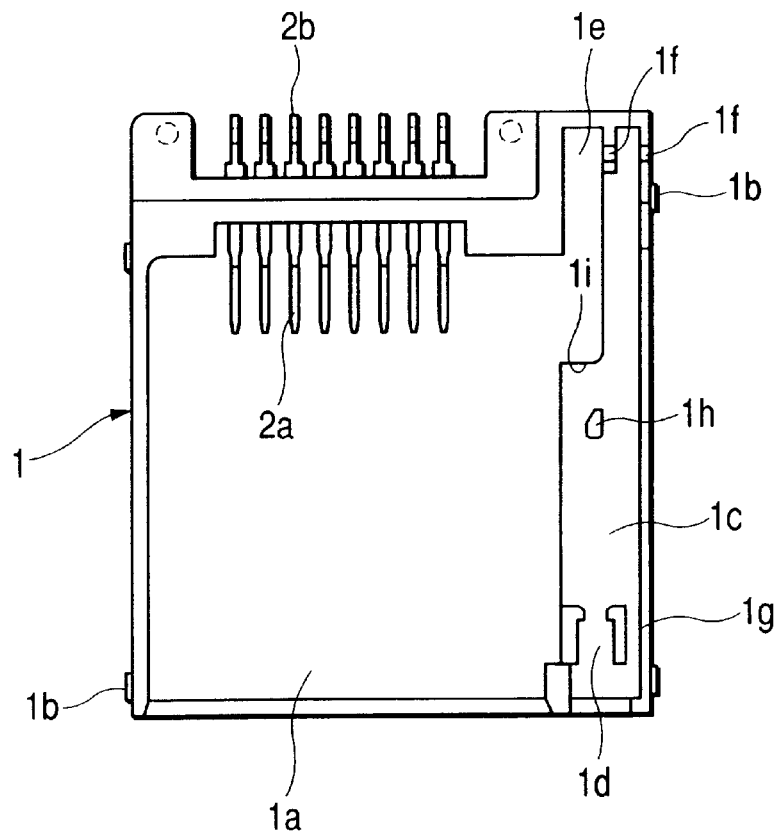
FIG. 3 is a plan view of a housing of the card connector.
Figure 4:
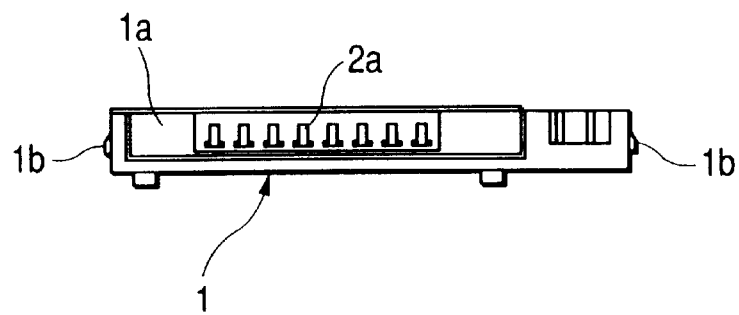
FIG. 4 is a front view of the housing.
Figure 5:
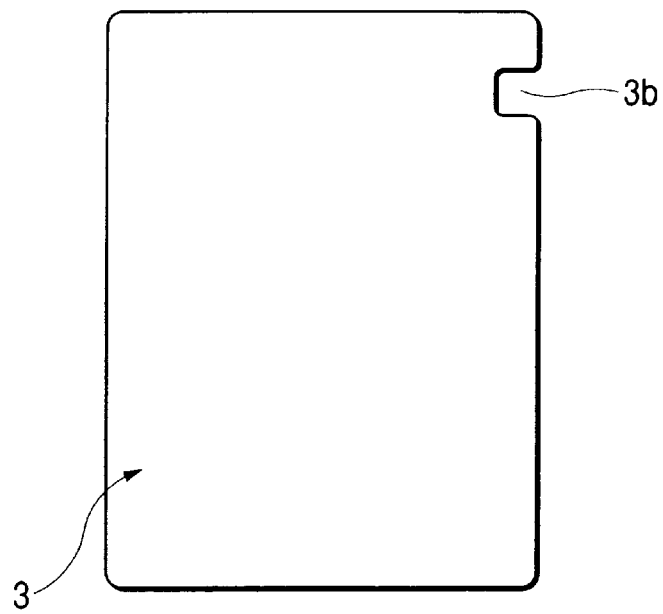
FIG. 5 is a plan view of a card.
Figure 6:
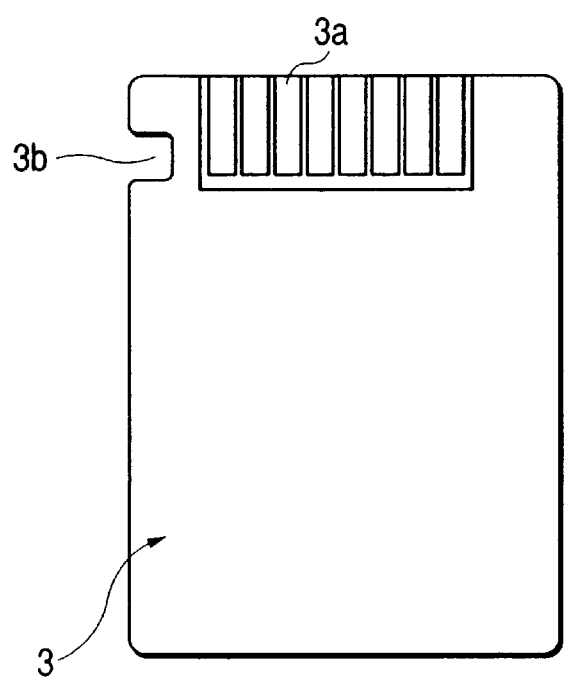
FIG. 6 is a bottom view of the card.
Figure 7:
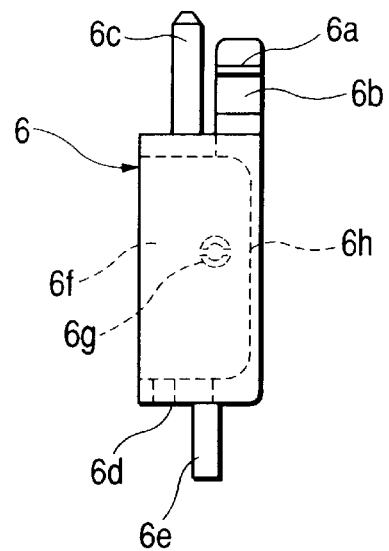
FIG. 7 is a plan view of a slide member of the card connector.
Figure 8:
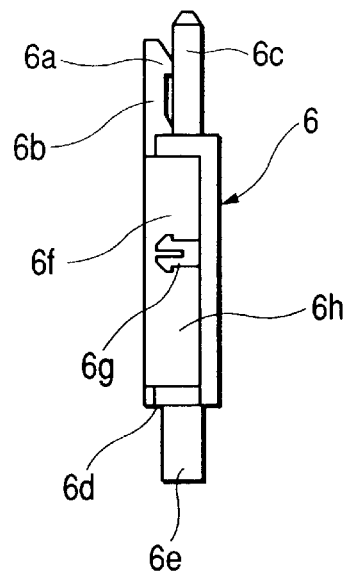
FIG. 8 is a side view of the slide member.
Figure 9:
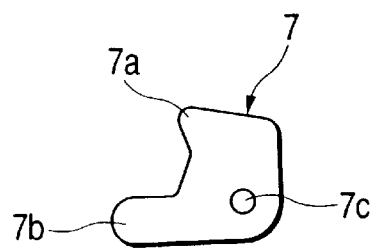
FIG. 9 is a plan view of an eject arm of the card connector.
Figure 10:
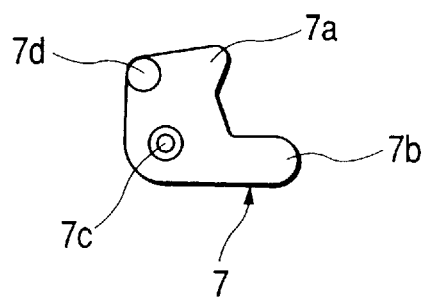
FIG. 10 is a bottom view of the eject arm.
Figure 11:
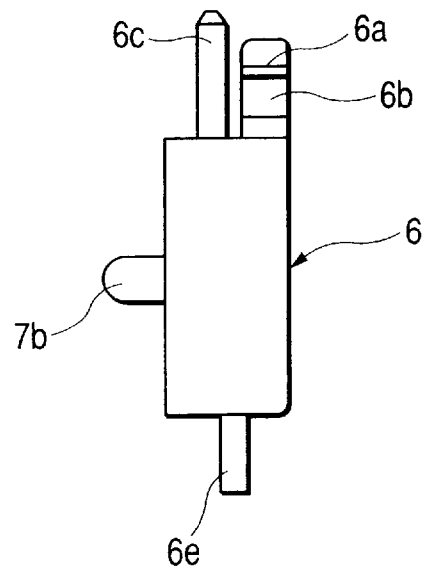
FIG. 11 is a plan view of a slide unit of the card connector.
Figure 12:
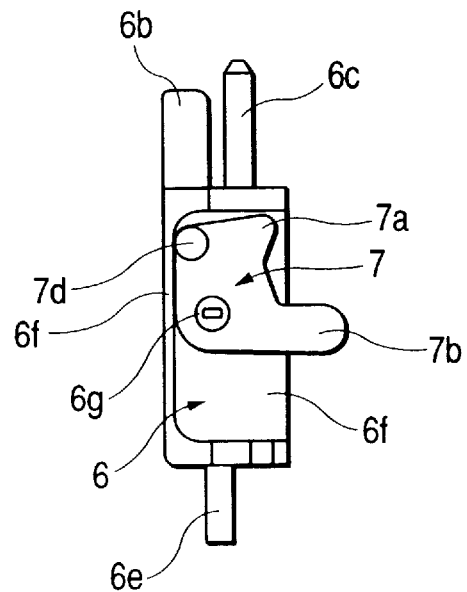
FIG. 12 is a bottom view of the slide unit.
Figure 13:
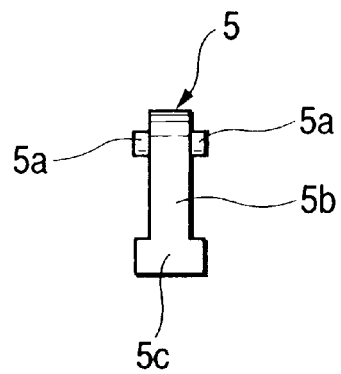
FIG. 13 is a plan view of a locking member of the card connector.
Figure 14:
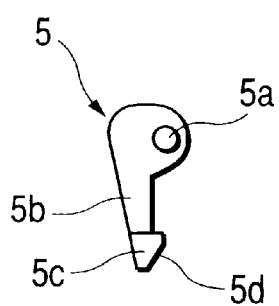
FIG. 14 is a side view of the locking member.
Figure 15:
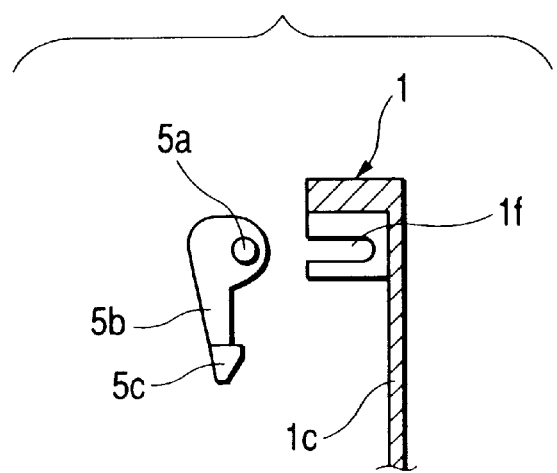
FIG. 15 is a vertical cross-sectional view showing a mounting relationship between the locking member and the housing.
Figure 16:
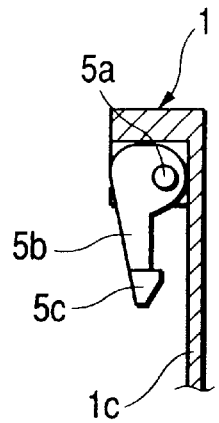
FIG. 16 is a vertical cross-sectional view showing a mounting relationship between the locking member and the housing.
Figure 17:
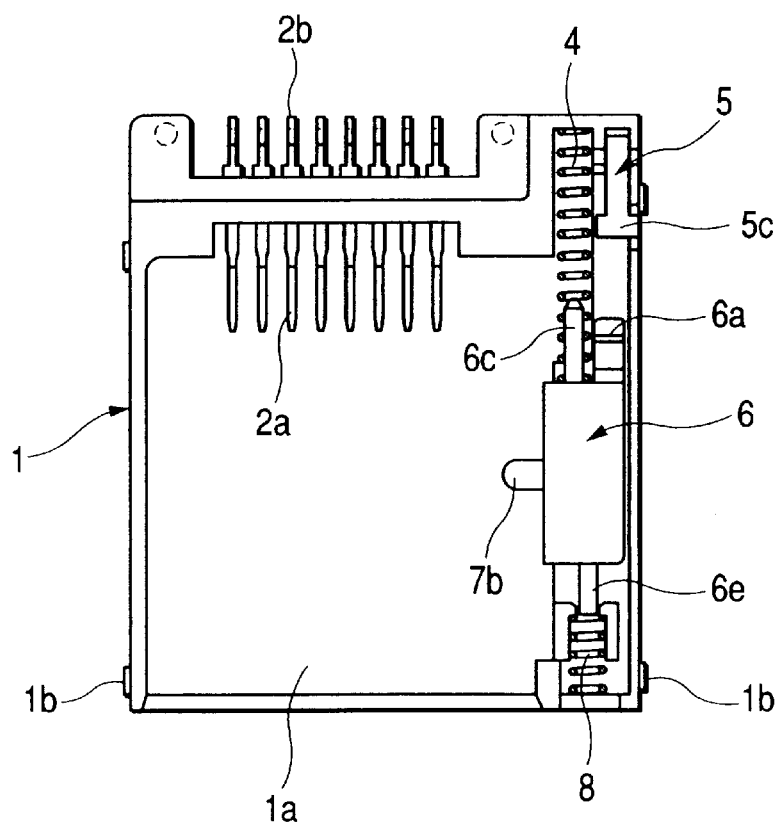
FIG. 17 is a plan view showing a state in which the slide unit is mounted in the housing.
Figure 18:
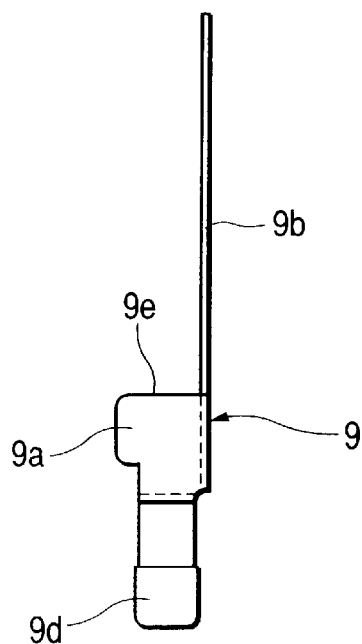
FIG. 18 is a plan view of a push rod.
Figure 19:
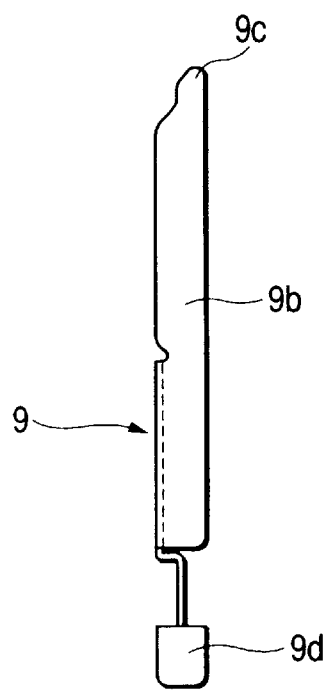
FIG. 19 is a side view of the push rod
Figure 20:
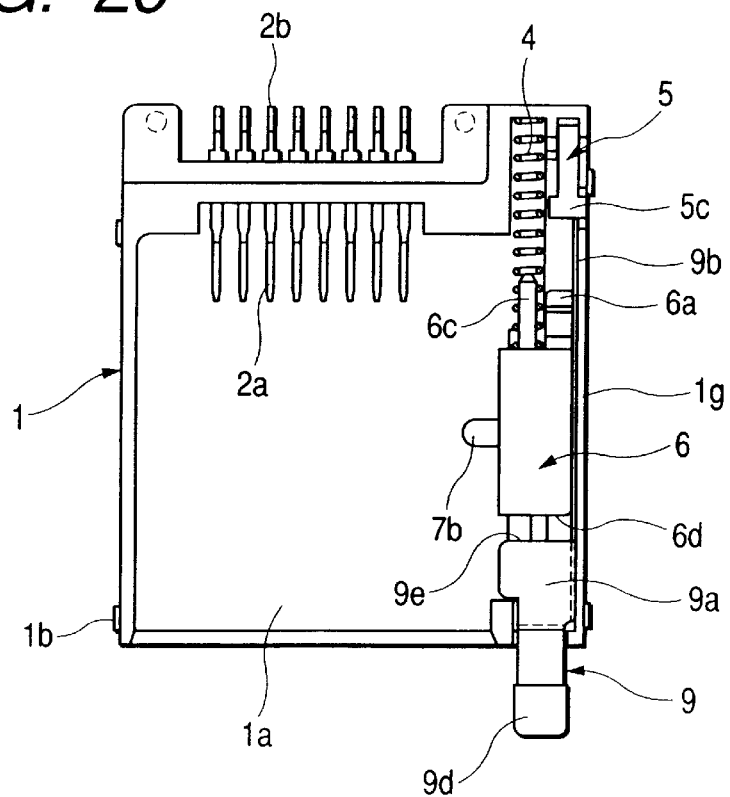
FIG. 20 is a plan view showing a state in which the push rod is mounted in the housing.
Figure 21:
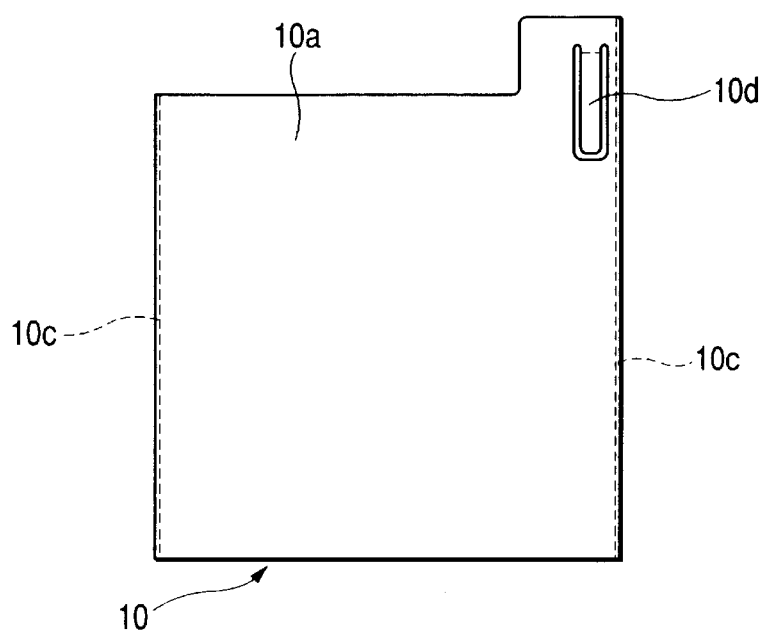
FIG. 21 is a plan view of a cover.
Figure 22:
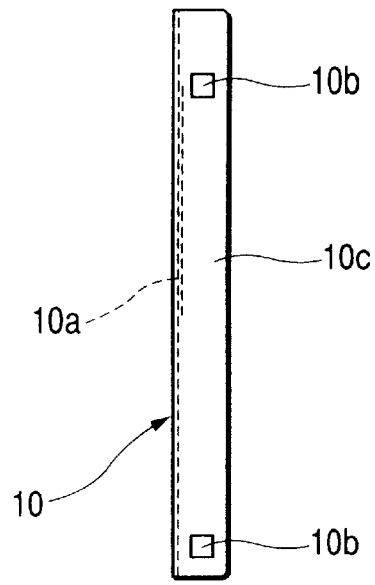
FIG. 22 is a side view of the cover
Figure 23:
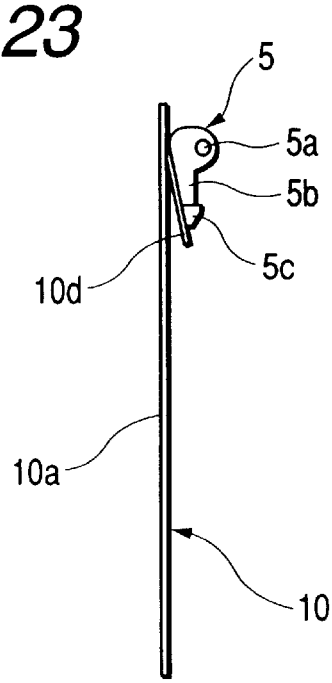
FIG. 23 is a side view showing a mounting relationship between the lock member and the cover.

Hereinafter, one embodiment of the present invention is shown in FIGS. 1 to 35. FIG. 1 is a plan view showing a card connector of the present invention; FIG. 2 is a plan view of the same; FIG. 3 is a plan view of a housing; FIG. 4 is a front view of the same; FIG. 5 is a plan view of a card; FIG. 6 is a bottom view of the same; FIG. 7 is a plan view of a slide member; FIG. 8 is a side view of the same; FIG. 9 is a plan view of an eject arm; FIG. 10 is a bottom view of the same; FIG. 11 is a plan view of a slide unit; FIG. 12 is a bottom view of the same; FIG. 13 is a plan view of a locking member; FIG. 14 is a side view of the same; FIGS. 15 and 16 are views showing a mounting relationship between the locking member and the housing; FIG. 17 is a view showing a state in which the slide unit is mounted in the housing; FIG. 18 is a plan view of a push rod; FIG. 19 is a side view of the same; FIG. 20 is a view showing a state in which the push rod is mounted in the housing; FIG. 21 is a plan view of a cover; FIG. 22 is a side view of the same; and FIG. 23 is a view showing a mounting relationship between the lock member and the cover.

In the drawings, the housing 1 is nearly rectangularly made of an insulating material such as a synthetic resin and is provided with an internal housing part 1a in which an IC card 3 to be described later is inserted and housed. Plural contact terminals 2a made of conductive metallic materials are disposed on the inside bottom of the housing part 1a, and at the other ends of the contact terminals 2a are formed connection terminals 2b that are guided outwardly of the housing 1 and are connected with a circuit pattern such as an external circuit board not shown.

Plural engaging claws 1b for engaging a cover 10 to be described later are provided in the circumference of the housing 1.

At one end of the housing 1 is provided a concave flat part 1c adjacent to the housing part 1a, and a slide member 6 to be described later is disposed in the flat part 1c. At a lower end of the flat part 1c is provided a concave housing part 1d in which a coil spring 8 to be described later is housed, and on the upper surface of the housing 1, in facing relation with the concave housing part 1d, is provided a concave anchoring part 1e for anchoring a return spring 4 for returning the slide member 7.

At an upper end of the flat part 1c is provided an anchoring slot 1f for anchoring a locking member 5 to be described later, and at one side of the flat part 1c is formed a guide wall 1g for guiding a push rod 9.

A nearly trapezoidal cam part 1h is projectingly provided at the center of the flat part 1c. By a cam wall at the outer circumference of the cam part 1h, a cam pin 7d provided in an eject arm 7 engaged in the slide member 6 to be described later is guided, and the cam pin 7d moves along the cam wall at the outer circumference of the cam part 1h as the slide member 6 moves, whereby the turning of the eject arm 7 is restrained. On the upper surface of the cam part 1h of the flat part 1c is provided a flat upper wall part 1i in a direction perpendicular to a card insert direction.

The card 3, which internally houses integrated circuits (IC), is widely used as a storage medium. At the bottom of the card 3, plural contact parts 3a are formed at one end of the card 3, and the contact parts 3a contact the plural contact terminals 2a provided in the housing part 1a of the housing 1, and thereby various types of information processing are performed with an electronic apparatus externally connected.

The card 3 is, at one side thereof, provided with a concave part 3b in which a second arm part 7b of the eject arm 7 to be described later is engaged.

The locking member 5 is made of an insulating material such as a synthetic resin, and at a nearly central position of the locking member 5 are formed a pair of anchoring shafts 5a anchored to the anchoring slot 1f of the housing 1. A hooked anchoring part 5c that can be engaged in and disengaged from the slide member 6 to be described later is formed at the tip of an anchoring arm part 5b extended from the center. A slant part 5d is provided at the tip of the anchoring part 5c, and an unlocking operation part 9c of the push rod 9 abuts the slant part 5d, whereby the anchoring part 5c turns with the anchoring shaft 5a as a fulcrum.

In this case, the locking member 5 is disposed so that it can turn in a direction (vertical direction) perpendicular to the flat surface of the card 3 engaged in and disengaged from the housing 1. This construction requires no space for movement in horizontal directions, contributing to reducing the width of the housing 1.

The slide member 6, which is made of an insulating material such as a synthetic resin, has, at one end thereof, an engaging arm part 6b having an engaging projection part 6a engaged with the anchoring part 5c of the locking member 5. In parallel with the anchoring arm part 6b is formed an anchoring shaft 6c at which one end of the return spring 4 anchored to the housing 1 is anchored. At the other end of the slide member 6, in facing relation with the anchoring shaft 6c, is formed a stopper face 6d comprising a wide plane abutted against a stopper 9e of the push rod 9 to be described later, and further the stopper face 6d is provided with a projectingly stop projection part 6e. The projectingly stop project part 6e abuts a coil spring 8 to be described later housed in the concave anchoring part 1d of the housing 1.

An opening 6f is provided at a nearly central position of the slide member 6, and at the center of the opening 6f is projectingly disposed a shaft part 6g in which an eject arm 7 to be described later is turnably fitted.

The slide member 6, disposed in the flat part 1c of the housing 1, is mounted so that it can move vertically within the housing 1, that is, in the directions in which the card 3 is inserted and ejected, while being energized by the return spring 4.

The eject arm 7 is made of an insulating material such as a synthetic resin and formed in shape similar to the U character, and has first and second arm parts 7a and 7b extended outwardly from the base. The first arm part 7a is provided to be engaged in the front end of the card 3 when the card 3 is inserted. The second arm part 7b has an tip part whose shape is nearly circular, and is engaged with the concave part 3b formed at one side of the card 3 and is engaged or disengaged while turning within the concave part 3b.

The eject arm 7 has a shaft hole 7c formed at the center thereof, and the shaft hole 7c is fitted into the shaft part 6g formed in the slide member 6, whereby the eject arm 7 can turn around the shaft part 6g. At one side of the eject arm 7 is provided a pin-shaped cam pin 7d moving along the cam wall of the cam part 1h provided on the housing 1.

FIGS. 11 and 12 show a slide unit in which the slide member 6 is fitted with the eject arm 7.

The coil spring 8, which is a compression spring made of a metallic material and housed in the concave anchoring part 1d of the housing 1, is formed to position the slide member 6 in a card eject position against an energizing force of the return spring 4 when the slide member 6 moves in a card eject direction.

The coil spring 8 has a function as an energizing member for energizing the slide member 6 in the insert direction and a function to return the push rod 9 from a push-in position to a standby position.

The push rod 9, which is formed by bending a thin metallic plate, comprises a rectangular substrate 9a and a side plate part 9b that is bent at the right angle and is elongated in the shape of thin plate toward one end from the substrate 9a. At the tip of an elongation of the side plate part 9b is formed the unlocking operation part 9c that abuts the slant part 5d provided at the tip of the anchoring part 5c and turns the locking member 5.

The substrate 9a is fitted with a press button 9d operated by human fingers or the like, and at a side opposite to the press button 9d is provided a stopper 9e having a wide plane. The stopper face 6d of the slide member 6 abuts the stopper 9e, thereby restraining the movement of the slide member 6.

The push rod 9 and the slide member 6 together are incorporated in the housing 1 and the side plate part 9b is guided to the guide wall 1g provided in the housing 1 so that it moves within the housing 1.

The cover 10, made of a metallic plate material, has a flat upper plate part 10a, and side plate parts 10c which are bent at right angles from the upper plate part 10a and have plural anchoring windows 10b engaged in the engaging claws 1b of the housing 1. The cover 10 is provided on the upper surface of the housing 1 to cover opening parts of the housing 1.

A raised spring piece 10d is provided on the upper plate part 10a of the cover, and the spring piece 10d is abutted against the anchoring arm part 5b of the locking member 5 so that it energizes the anchoring part 5c toward the engaging projection part 6a of the slide member 6. With this construction, a spring member for energizing the locking member 5 need not be provided separately, contributing to reduction in the number of parts and a smaller size of the housing 1.

Next, the operation of the card connector described above will be described with reference to FIGS. 24 to 35.

Figure 24:
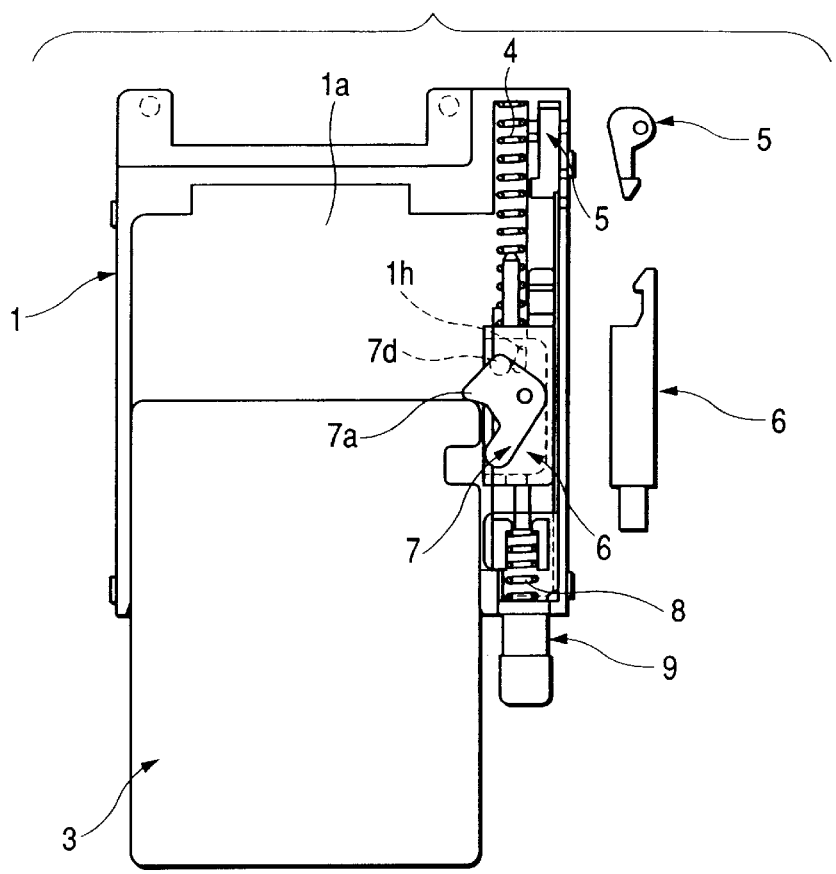
FIG. 24 is a plan view showing an initial state in which the card is inserted in the housing, and a side view showing the locking member and the slide member in that state.
Figure 25:
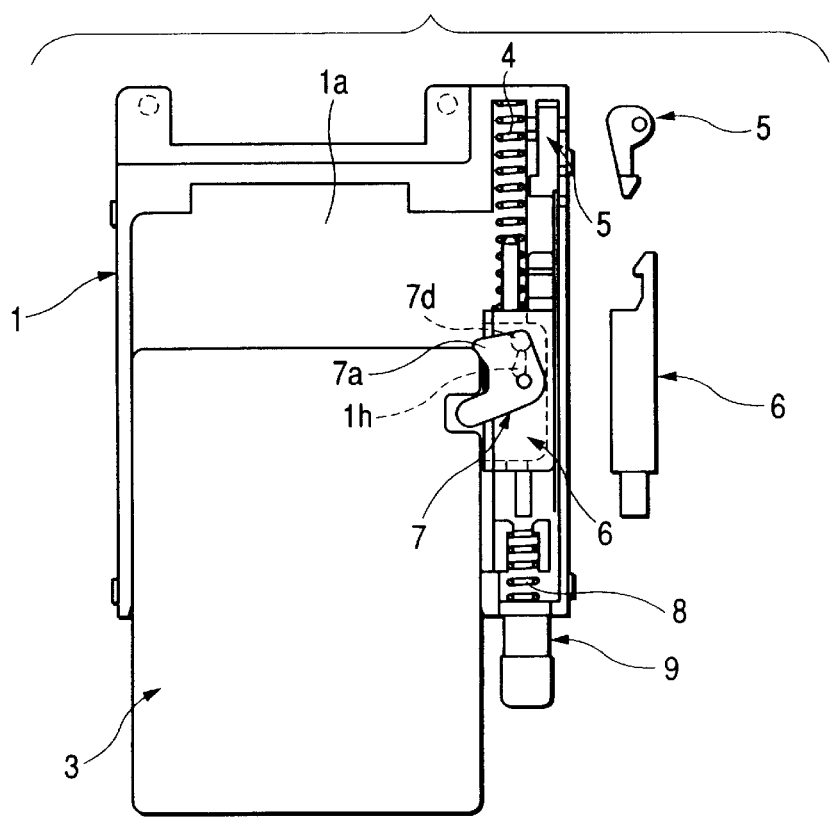
FIG. 25 is a plan view showing a state in which the card is being inserted, and a side view showing the locking member and the slide member in that state.
Figure 26:
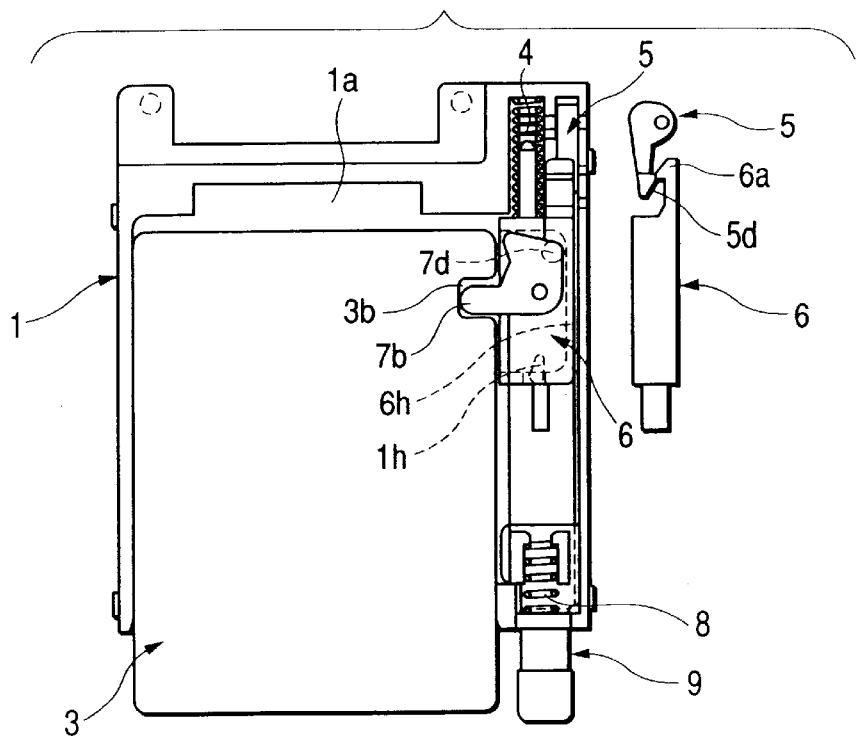
FIG. 26 is a plan view showing a state in which the card is being inserted immediately before the slide member and the locking member are engaged in each other, and a side view showing the locking member and the slide member in that state.
Figure 27:
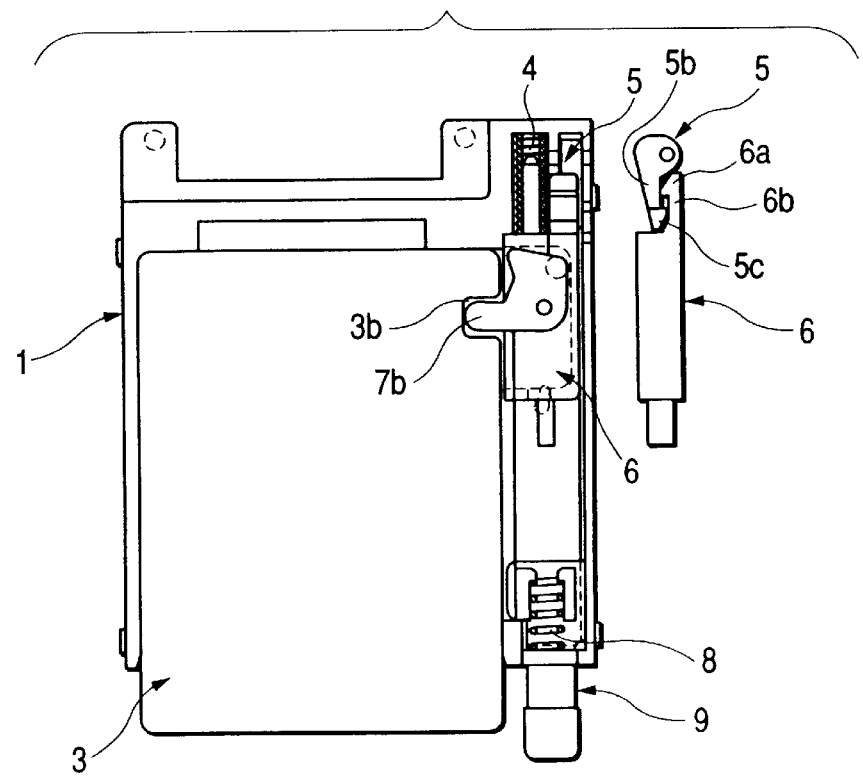
FIG. 27 is a plan view showing a state in which the card has been inserted, and a side view showing the locking member and the slide member in that state.
Figure 28:
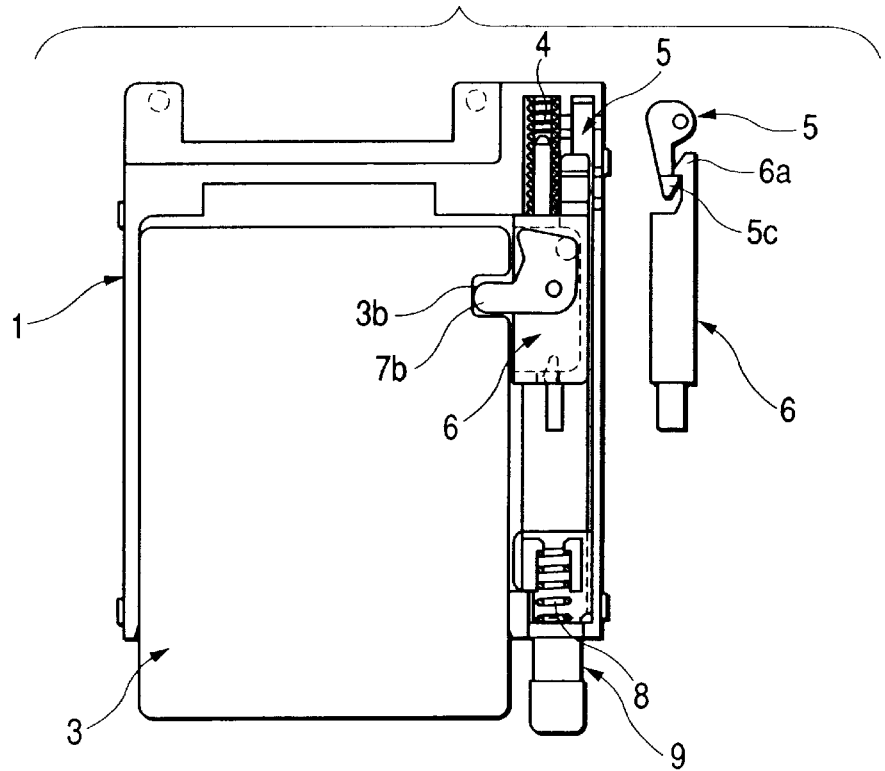
FIG. 28 is a plan view showing a state in which the slide member is locked when the card has been inserted, and a side view showing the locking member and the slide member in that state.
Figure 29:
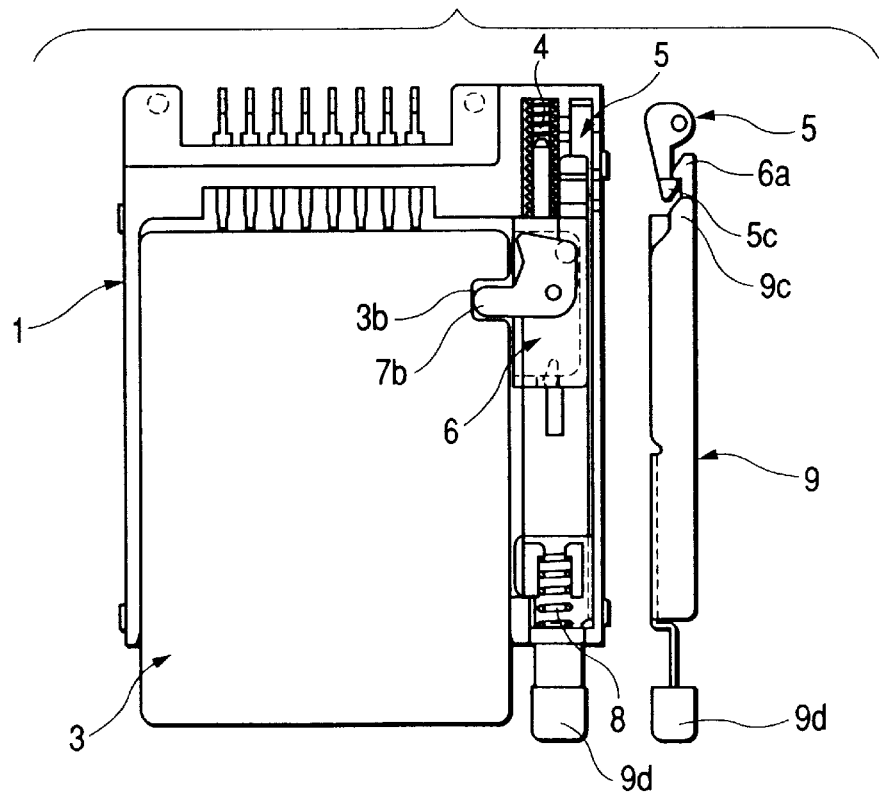
FIG. 29 is a plan view showing a state in which the slide member is locked, and a side view showing the locking member and the push rod in that state.
Figure 30:
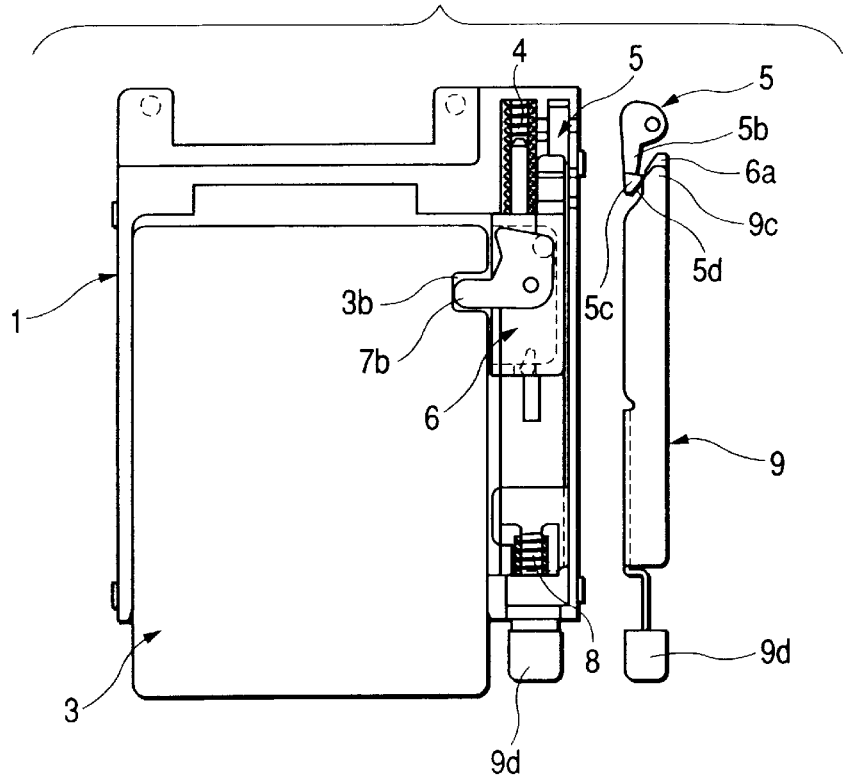
FIG. 30 is a plan view showing a state in which the slide member is unlocked by pressing the push rod, and a side view showing the locking member and the push rod in that state.
Figure 31:
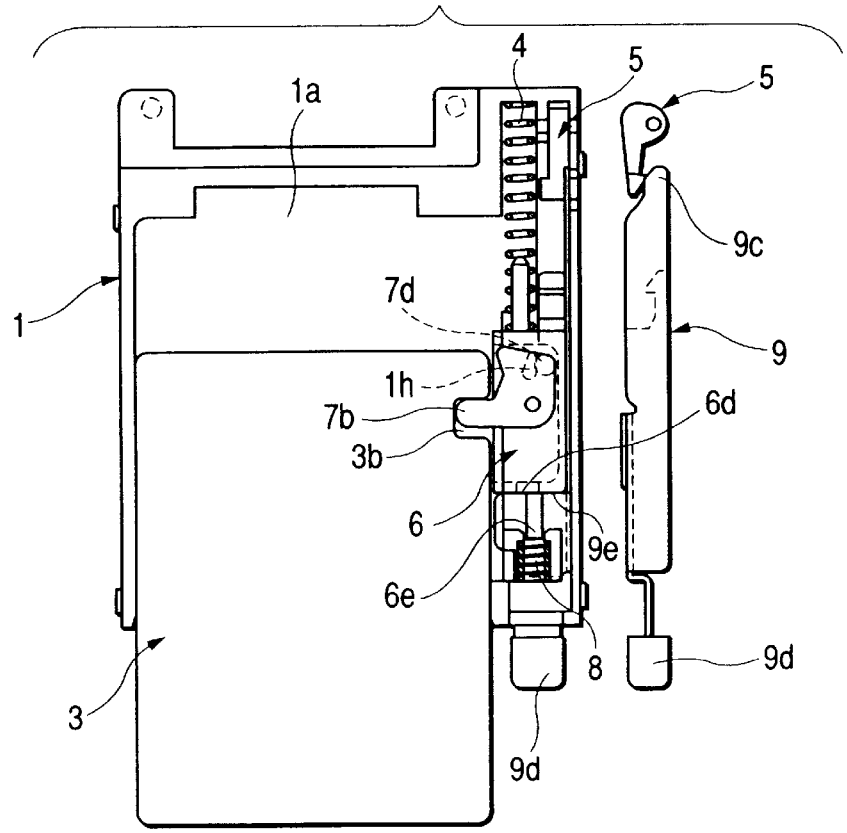
FIG. 31 is a plan view showing a state in which the locked slide member is unlocked and the card has been ejected to an eject position, and a side view showing the locking member and the push rod in that state.
Figure 32:
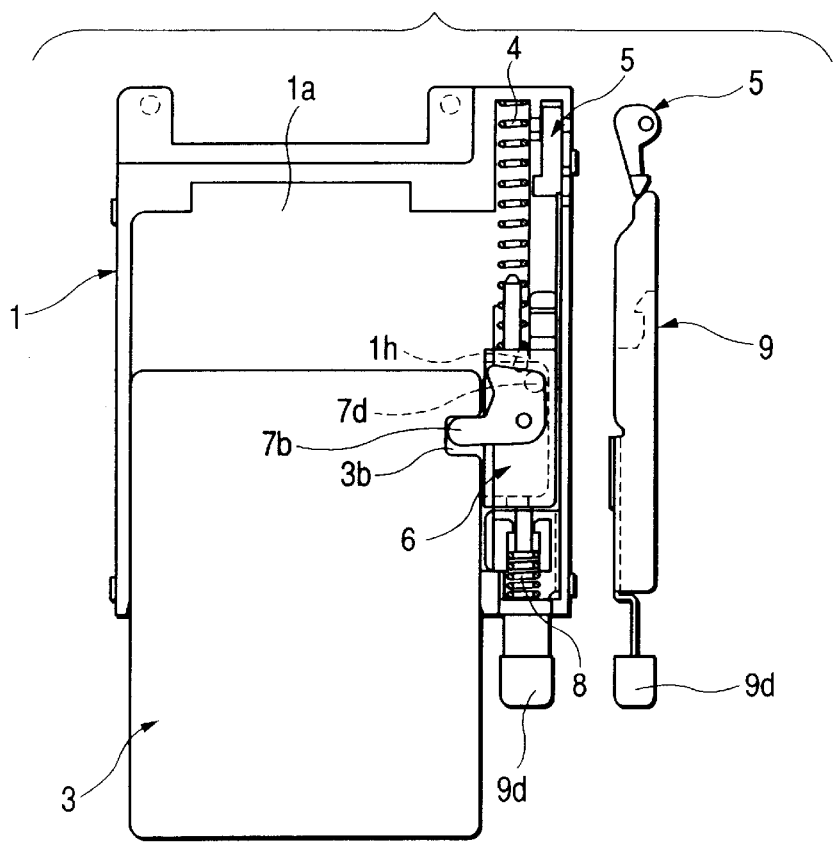
FIG. 32 is a plan view showing a state in which the card is pulled toward the operator at the card eject position, and a side view showing the locking member and the push rod in that state.
Figure 33:
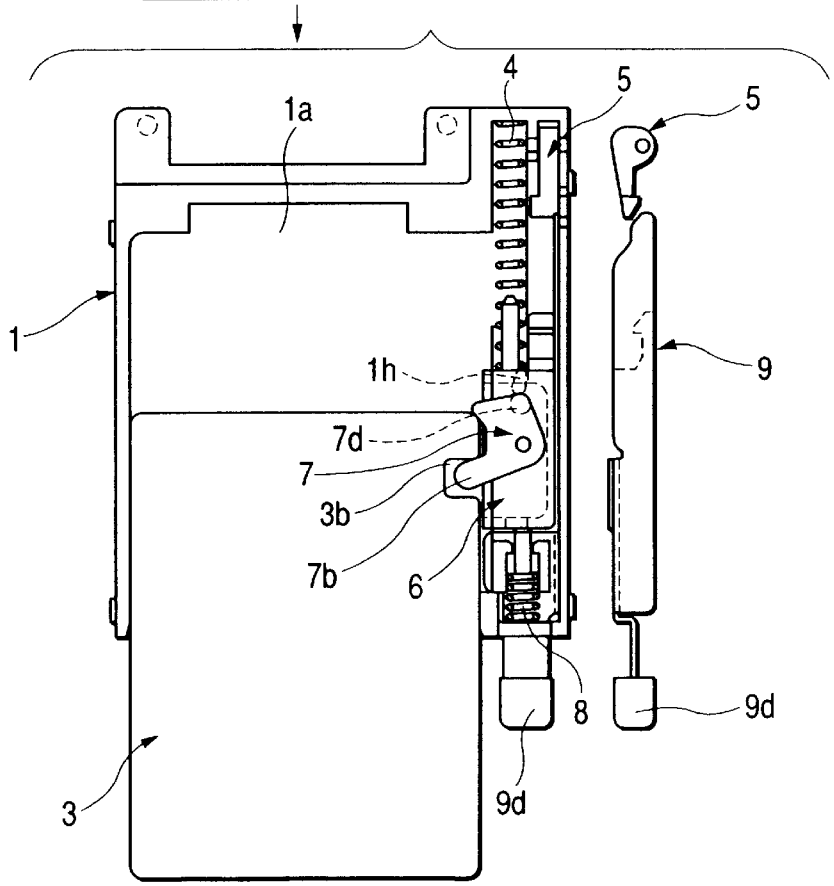
FIG. 33 is a plan view showing a state in which the eject arm turns in the eject direction when the card is being ejected, and a side view showing the locking member and the push rod in that state.
Figure 34:
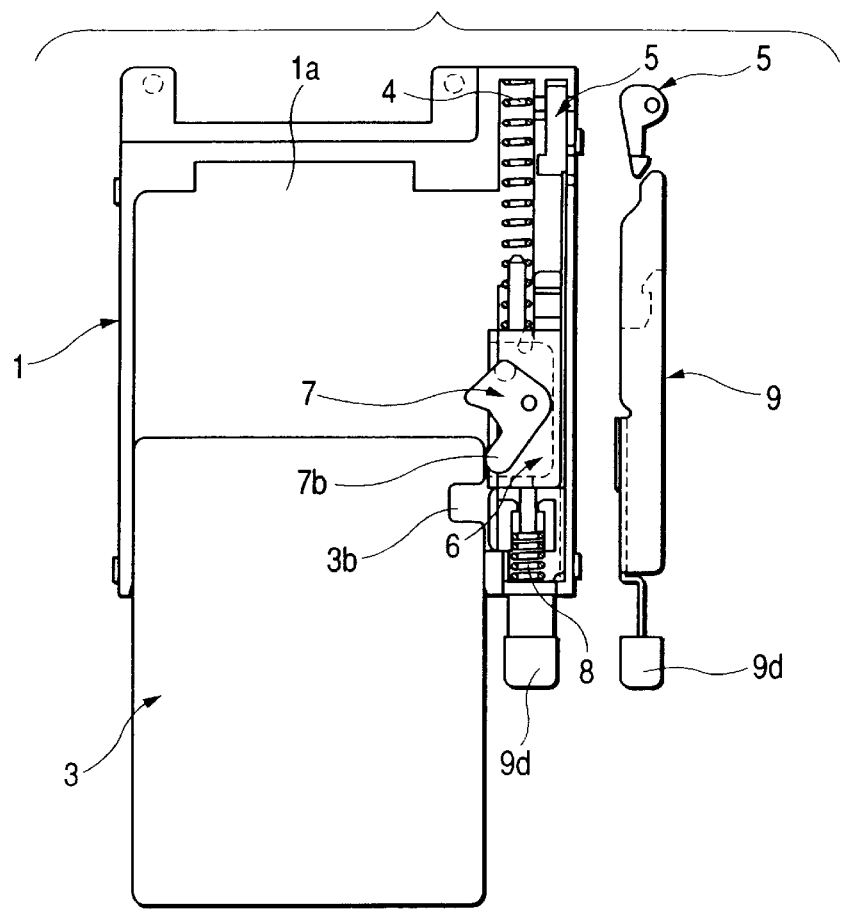
FIG. 34 is a plan view showing a state in which the card is ejected disengaged from a second arm part, and a side view showing the locking member and the push rod in that state.
Figure 35:
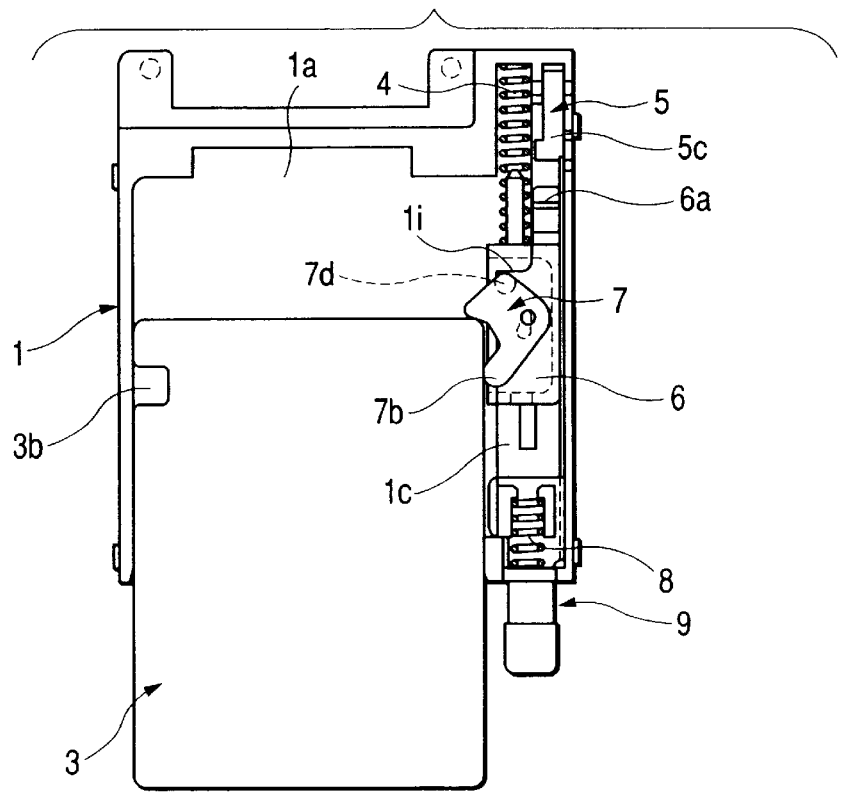
FIG. 35 is a plan view showing a state in which a reversed card is inserted.

FIGS. 24 to 34 illustrate insert/eject operations of the card connector of the present invention: FIG. 24 shows an initial state in which the card is inserted in the housing; FIG. 25 shows a state in which the card is being inserted; FIG. 26 shows a state in which the card is being inserted immediately before the slide member and the locking member are engaged in each other; FIG. 27 shows a state in which the card has been inserted; FIG. 28 shows a state in which the slide member is locked when the card has been inserted; FIG. 29 shows a relationship between the locking member with the slide member locked, and a push rod; FIG. 30 shows a state in which the slide member is unlocked by pressing the push rod; FIG. 31 shows a state in which the locked slide member is unlocked and the card has been ejected to an eject position; FIG. 32 shows a state in which the card is pulled toward the operator at the card eject position; FIG. 33 shows a state in which the eject arm turns in the eject direction when the card is being ejected; FIG. 34 shows a state in which the card is ejected disengaged from a second arm part; and FIG. 35 shows a state in which a reversed card is inserted.

In the drawings, to clarify the states in which the locking member and the slide member, and the locking member and the push rod are engaged in and disengaged from each other, side views are interspersed as required.

First, the card 3 is inserted in the housing part 1a of the housing 1. At this time, the first arm part 7a of the eject arm 7 abuts the tip of the card 3 and is pressed in an card insert direction. (FIG. 24)

At this time, since a cam pin 7d of the eject arm 7 is restrained in motion by the cam part 1h of the housing 1, the first arm part 7a is not turned in the card insert direction and the slide member 6 moves in the card insert direction against an energizing force of the return spring 4. At this time, the cam pin 7d provided on the eject arm 7 moves along the cam wall of the cam part 1h provided on the housing 1, so that the eject arm 7 moves by a certain distance in restrained mode in the card insert direction. (FIG. 25)

When the card 3 is further pressed in the insert direction against the energizing force of the return spring 4, the slide member 6 moves in the card insert direction and the cam pin 7d disengages from the cam wall of the cam part 1h and abuts the side wall 6h of the opening 6f of the slide member 6. At this time, the eject arm 7 turns by a certain distance in the card insert direction, whereby the second arm part 7b is engaged in a concave part 3b of the card 3. At this time, the contact parts 3a of the card 3 are brought into contact with the contact terminals 2a of the housing 1. At this time, the locking member 5 is abutted against the slide member 6 and the engaging projection part 6a presses the slant part 5d of the locking member 5 in accordance with the movement of the slide member 6, whereby the locking member 5 turns a little clockwise as shown in the side view. (FIG. 26)

Next, when the card 3 is further pressed in the insert direction, the slide member 6 moves in the card insert direction, and when the card 3 abuts the inside edge of the housing part 1a of the housing 1, the insertion is ceased, thus completing the loading of the card 3 into the housing 1. As a result, the movement of the slide member 6 and the eject arm 7 is stopped. At this time, since the anchoring arm part 5b of the locking member 5 is energized toward the engaging arm part 6b of the slide member 6 by the spring slip 10d provided on the cover 10, the locking member 5 is turned counterclockwise as shown in the side view when the engaging projection part 6a disengages from the slant part 5b, and therefore the anchoring part 5c of the locking member 5 is correctly opposed to the engaging projection part 6a of the slide member 6. (FIG. 27)

Next, when pressure to the card 3 is ceased, the slide member 6 is returned only a little in the card eject direction by an energizing force of the return spring 4, at which time the engaging projection part 6a is engaged with the anchoring part 5c of the locking member 5, and thereby the slide member 6 is locked at that position. (FIG. 28)

Next, to eject the card 3 loaded in the housing 1, in the state in which the card 3 is loaded (FIG. 29), the press button 9d of the push rod 9 at the standby position is pressed by a finger or the like against the energizing force of the coil spring 8 until the push rod 9 is moved to the push-in position in the card insert direction. By this operation, the unlocking operation part 9c presses the slant part 5d of the locking member 5 and thereby the anchoring arm part 5b of the locking member 5 is turned clockwise as shown in the side view and the anchoring part 5c of the locking member 5 is disengaged from the engaging projection part 6a of the slide member 6. (FIG. 30)

The slide member 6 is moved in the card eject direction by the energizing force of the return spring 4. At this time, the unlocking operation part 9c of the push rod 9 is formed on the side plate part 9b that is bent at the right angle and is elongated in the shape of thin plate toward one end of the push rod 9, the push rod 9 can be disposed so as not to prevent the movement of the slide member 6. The small space required for the disposition contributes to reducing the width of the housing 1.

As the slide member 6 moves in the card eject direction, the eject arm 7 moves in the card eject direction with its turning restrained along with the slide member 6 up to the point at which the cam pin 7d abuts the cam wall of the cam part 1h. The back end of the stop projection part 6e of the slide member 6 abuts the end of the coil spring 8, whereby the movement of the slide member 6 is stopped and the card 3 is stopped at the eject position.

At this time, the stopper 9e having a wide plane is provided on the substrate 9a of the push rod 9, and at the push-in position, the stopper face 6d provided at one end of the slide member 6 moved in the card eject direction abuts the stopper 9e, whereby the movement of the slide member 6 is stopped without fail and the card 3 is stopped at the eject position. At this time, the contact parts 3a of the card 3 are brought out of contact with the contact terminals 2a of the housing 1. (FIG. 31)

In this case, the card 3 is engaged in the second arm part 7b in the concave part 3b and the cam pin 7d is restrained in its turning because it is abutted against the cam wall of the cam part 1h. This construction prevents the card 3 from popping out of the housing part 1a of the housing 1.

Next, when pressure to the push rod 9 is ceased, the push rod 9 is returned to its initial position by the energizing force of the coil spring 8. At this time, the contact between the stopper face 6d of the slide member 6 and the stopper 9e of the push rod 9 is broken off so that the slide member 6 can move in the card eject direction.

If the card 3 is pulled out by a finger or the like in this state, the slide member 6 moves toward the operator against the energizing force of the coil spring 8, the cam pin 7d moves in the direction that disengages from the cam wall of the cam part 1h, and the eject arm 7 becomes turnable in the card eject direction. (FIG. 32)

If the card 3 is further pulled out in this state, the coil spring 8 is compressed and thereby the slide member 6 moves in the card eject direction. At this time, the eject arm 7 becomes turnable in the card 3 eject direction. (FIG. 33)

In accordance with further movement of the eject arm 7 in the card eject direction, the second arm part 7b is disengaged from the concave part 3b of the card 3 so that the card 3 is ejected from the housing part 1a of the housing 1. (FIG. 34)

If the card 3 is ejected, the slide member 6 is moved in the card insert direction by the energizing force of the coil spring 8 and returns to its initial state (FIG. 24).

According to the above-described embodiment of the present invention, the push rod 9 for unlocking the locking member 5 by a pressing operation to move the slide member 6 to the position in which the card 3 is ejected is provided with the stopper 9e for blocking the slide member 6 at the card 3 eject position from moving in the card eject direction when the push rod 9 is pressed up to the push-in position. This construction never fails to stop the movement of the slide member 6, stops the card 3 at the eject position, and prevents the card 3 from popping out of the housing part 1a of the housing 1.

Since the spring for returning the push rod 9 is also used as the spring for positioning the slide member 6 at the card 3 eject position, plural springs need not be provided separately, contributing to simplifying the construction.

FIG. 35 shows a state in which a carelessly reversed card is inserted, wherein the concave part 3b provided on the card 3 is positioned (the left side of the drawing) opposite to the position in which the eject arm 7 is mounted. In this case, when the card 3 is being inserted, the second arm part 7b cannot be engaged in the concave part 3b, and the eject arm 7 moves in the card insert direction while being restrained in its turning. At this time, although the cam pin 1h moves along the side wall of the flat part 1c of the housing 1, it abuts the upper wall part 1i provided on the upper surface of the flat part 1c and is prevented from further moving in the card insert direction.

In this case, the inability to further insert the card 3 in the insert direction prevents an inadvertent breakage of the contact terminals 2a disposed on the housing 1. In this state, since the slide member 6 is not moved up to the position in which the slide member 6 is locked by the locking member 5, if pressure to the card 3 is ceased, the card 3 is returned to the initial insert position of the card by the return force of the return spring 4. Therefore, a careless insertion can be easily judged.

Although, in the above embodiment, the type of a card connector in which the contact parts 3a and the contact terminals 2a face each other has been described, it goes without saying that the embodiment is also applicable to card connectors of pin/socket type.

As has been described, a card connector of the present invention has a push rod for unlocking a locking member by a pressing operation to move a slide member to the position in which a card is ejected, wherein the push rod is provided with a stopper for blocking the slide member at the card eject position from moving in the card eject direction when the push rod is pressed up to a push-in position, wherein the stopper permits the slide member at a standby position to move in the card eject direction. With this construction, when the card is ejected, the card is stopped at a card eject position with fail along with stopping the movement of the slide member, preventing the card from popping out of the housing part of the housing.

A coil spring is provided which abuts one end of the slide member when the slide member moves in the card eject direction, and the slide member is held in the card eject position by the coil spring against an energizing force of the return spring. With this construction, when the card is ejected, it can be stopped at the eject position along with stopping the movement of the slide member.

Since the push rod is returned from the push-in position to the standby position by the coil spring, plural springs need not be provided separately, simplifying the construction of the card connector.

The card is movable in the card eject direction along with the slide member, and the coil spring is compressed when the slide member has moved to the card eject position, whereby the slide member moves in the card eject direction so that the card can be pulled out. Therefore, with a simple construction, the slide member can be positioned.

The locking member is disposed so that it can turn in a direction perpendicular to a flat surface of the card loaded in and unloaded from the housing, by a pressing operation of the push rod, and a spring piece for energizing the locking member is formed on a cover member of the housing. This construction requires no space for movement in horizontal directions, contributing to reducing the width of the housing. Also, a spring member for energizing the locking member need not be provided separately, contributing to reduction in the number of parts and a smaller size of the housing.

Since the push rod is formed by bending a thin metallic plate, it can be disposed so as not to prevent the movement of the slide member. The small space required for the disposition contributes to reducing the width of the housing.

What is claimed is:

1. A card connector comprising:
   a slide member that is slidable in directions in which a card loaded in and unloaded from a housing is inserted and ejected;
   a return spring for energizing the slide member in the direction in which the card is ejected;
   a locking member for holding the slide member in a position in which the card is loaded, against an energizing force of the return spring; and
   a push rod, movably disposed between a standby position and a push-in position, for unlocking the locking member by a pressing operation to move the slide member to a position in which the card is ejected,
   wherein the push rod is provided with a stopper for blocking the slide member at the card eject position from moving in the card eject direction when the push rod is pressed up to the push-in position, wherein the stopper permits the slide member at a stand by position to move in the card eject direction.

2. The card connector according to claim 1, wherein the locking member is disposed so that it can turn in a direction perpendicular to a flat surface of the card loaded in and unloaded from the housing by a pressing operation of the push rod, and a spring piece for energizing the locking member is formed on a cover member of the housing.

3. The card connector according to claim 1, wherein the push rod is formed by bending a thin metallic plate.

4. The card connector according to claim 1, wherein a coil spring is provided which abuts one end of the slide member when the slide member moves in the card eject direction, and the slide member is held in the card eject position by the coil spring against an energizing force of the return spring.

5. The card connector according to claim 4, wherein the push rod is returned from the push-in position to the standby position by the coil spring.

6. The card connector according to claim 4, wherein the card is movable in the card eject direction along with the slide member, and the coil spring is compressed when the slide member has moved to the card eject position, whereby the slide member moves in the card eject direction and the card can be pulled out.

* * * * *

UNITED STATES PATENT AND TRADEMARK OFFICE
CERTIFICATE OF CORRECTION

PATENT NO.    : 6,319,029 B2
DATED         : November 20, 2001
INVENTOR(S)   : Toru Nishioka It is certified that error appears in the above-identified patent and that said Letters Patent is hereby corrected as shown below:

<u>Column 4,</u>
Line 19, please change "if" to -- 1f --.

Signed and Sealed this

Fourth Day of March, 2003

JAMES E. ROGAN
*Director of the United States Patent and Trademark Office*